United States Patent [19]

King

[11] 4,027,790
[45] June 7, 1977

[54] APPARATUS FOR DELIVERING PARTICULATE MATERIAL AT A SELECTED RATE

[75] Inventor: Jerry A. King, Palm Beach Gardens, Fla.

[73] Assignee: United Technologies Corporation, Hartford, Conn.

[22] Filed: Dec. 4, 1975

[21] Appl. No.: 637,625

[52] U.S. Cl. .............................. 222/285; 198/842; 222/415
[51] Int. Cl.² ...................................... G01F 11/10
[58] Field of Search ........... 198/195, 842; 222/285, 222/286, 371, 415

[56] References Cited

UNITED STATES PATENTS

| | | |
|---|---|---|
| 1,731,609 | 10/1929 | Brayton ............................ 198/195 |
| 1,752,549 | 4/1930 | Beardsley et al. ............. 222/415 X |
| 2,405,530 | 8/1946 | Sullivan ............................ 198/195 |
| 2,468,712 | 4/1949 | Kohler ......................... 222/286 X |
| 2,605,990 | 8/1952 | Peterson ....................... 222/415 X |

Primary Examiner—Robert B. Reeves
Assistant Examiner—David A. Scherbel
Attorney, Agent, or Firm—Charles A. Warren

[57] ABSTRACT

Apparatus for delivering measured quantities of particulate material from a supply to a receiver, such as conveyor tube, with the quantity precisely determined with respect to time. A conveyor belt is utilized, with the belt traveling under a metering nozzle, the metered quantity being determined by the rate of conveyor movement. The conveyor delivers the metered quantity to a receiving scoop from which the particulate material may be deposited in a conveyor tube at the metered rate that it is delivered by the belt.

3 Claims, 2 Drawing Figures

APPARATUS FOR DELIVERING PARTICULATE MATERIAL AT A SELECTED RATE

SUMMARY OF THE INVENTION

This concept was developed for use with a compacting press to which the particulate material, preferably metallic particles, are delivered by a conveyor tube in which the particles are heated before reaching the compacting container or receptacle. Such a press is described and claimed in the copending application of Jerry A. King et al, Ser. No. 637,624, filed Dec. 4, 1975 now U.S. Pat. No. 3,988,088 and having the same assignee as the application.

A feature of this invention is a device by which to deliver the proper quantity of particulate material at the proper rate to a receptacle that uses the material only at the established rate. Specifically, the delivery device of the invention is intended to transfer particulate material from a supply hopper at a precisely controlled rate to a transfer mechanism by which the material is carried through a furnace where it is heated to a compacting press.

More specifically the delivery device may be a conveyor belt traveling under a delivery spout having a metering opening spaced from and cooperating with the belt so that the particulate material is delivered at the selected rate onto the belt. This material is then deposited in a chute from which it reaches a conveyor tube extending through the furnace and by which the material is transferred through the furnace at the selected rate thereby assuming the proper heating and heat treatment of the material as it passes through the furnace.

The foregoing and objects, features, and advantages of the present invention will become more apparent in the light of the following detailed description of preferred embodiments thereof as illustrated in the accompanying drawing.

DESCRIPTION OF THE PREFERRED EMBODIMENT

Figure 1:
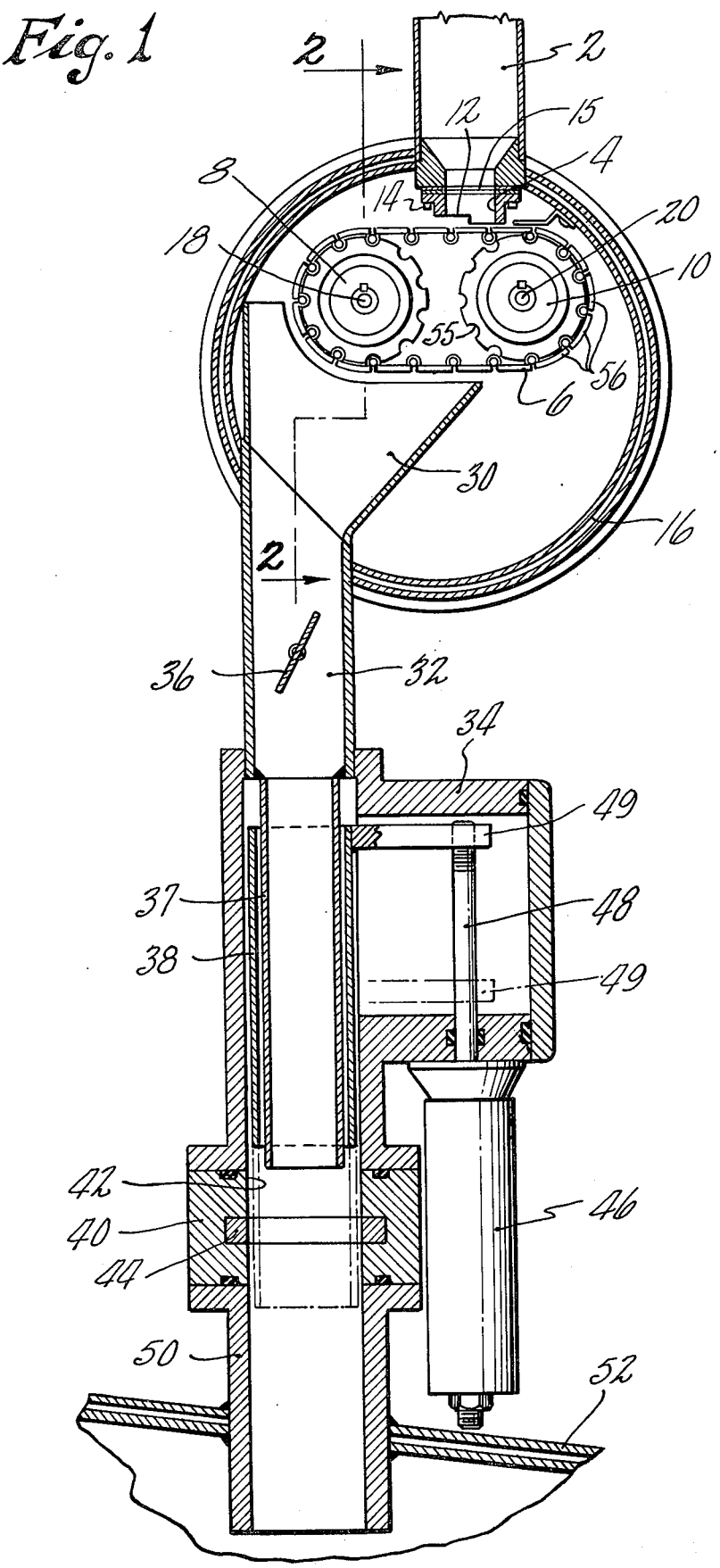
FIG. 1 is a vertical sectional view through the device.

Referring first to FIG. 1, the particulate material is delivered from a hopper, not shown, through a delivery spout 2 having an end opening in the form of a metering nozzle 4 at the bottom closely adjacent to a short conveyor belt 6 carried on spaced rollers on sprockets 8 and 10. The upper pass of the belt is closely positioned below the nozzle 4 and the latter, which is preferably circular, has a notch 12 formed thereon by shortening the nozzle somewhat on the downstream side. As shown, this nozzle is made removable from the spout 2 as by bolts 14 so as to permit substitution of a different dimension or shape of nozzle for changing the delivery rate and/or the placing of a different number of or a different thickness of shims 15 to vary the spacing above the belt. Effectively, the notch 12 is precisely spaced from the belt and delivers a bed of particulate material of the desired depth onto the conveyor.

The conveyor belt is enclosed in a chamber 16 into which the spout 2 extends and it is contemplated that the system may all operate in a vacuum, if desired.

Figure 2:
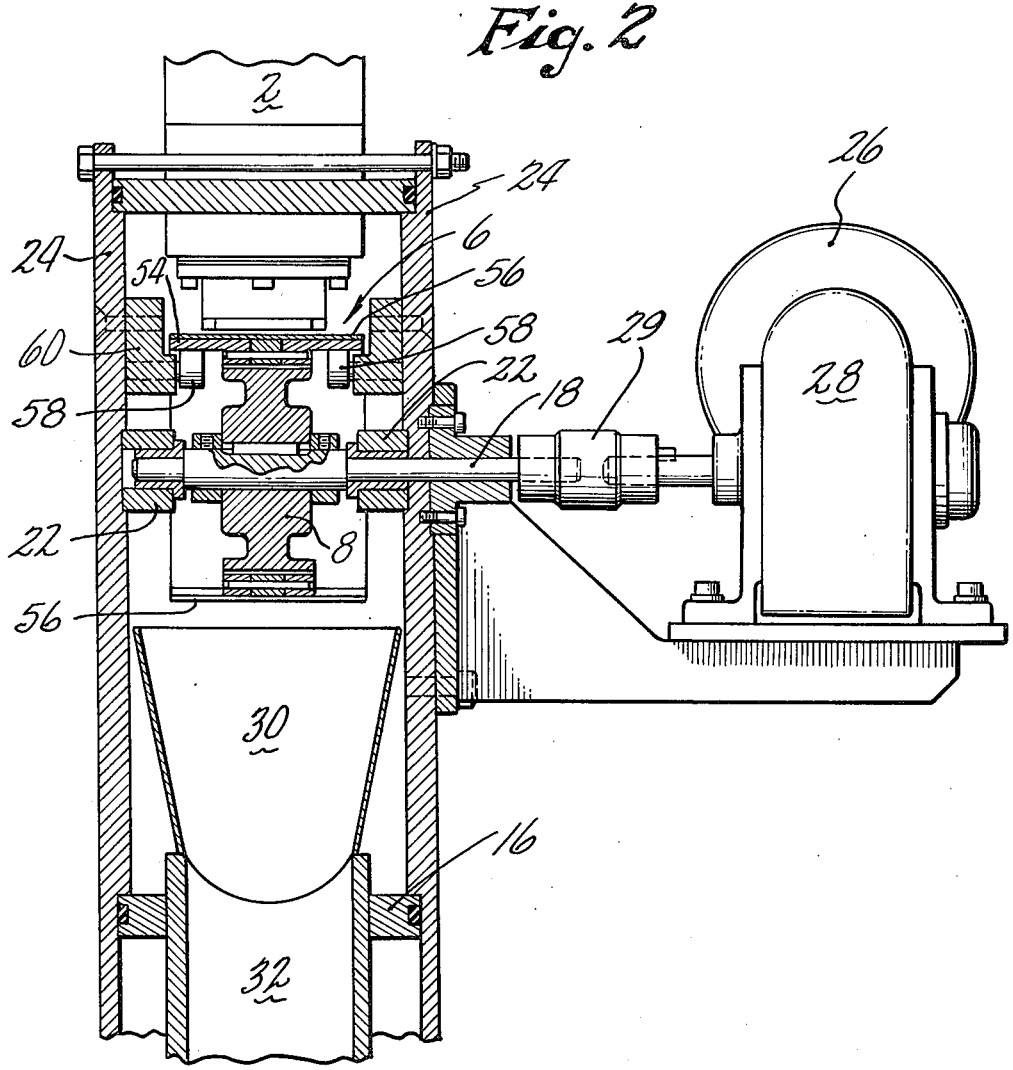
FIG. 2 is a vertical sectional view along line 2—2 of FIG. 1.

As shown in FIG. 2, the rolls 8 and 10 are mounted on shafts 18 and 20, journaled in bearings 22 on the side walls 24 of the chamber 16. The shaft 18 extends beyond one side wall 24 and is connected to a variable speed motor 26 operating through a speed reduction unit 28 and a coupling 29. This arrangement permits a control of the rate of movement of the belt past the delivery nozzle thereby controlling the feed rate of the particulate material. Obviously, the clearance area between the notch 12 and the belt surface assist in establishing the desired delivery rate, as above described. A cut-off switch, not shown, permits shutting off the motor when no delivery of material is desired.

The discharge end of the belt 6 is positioned over a scoop 30 also within the chamber 16. The scoop terminates in a vertical duct 32 passing through the wall of chamber 16 and terminating in a housing 34. A manually controlled valve 36 in the duct permits a cut off of flow through duct 32 when necessary. Within housing 34 are concentric sleeves 37 and 38 in vertical alignment with duct 32, the inner sleeve 37 being secured at its upper end to the bottom of duct 32 to form an extension of the duct.

Near the bottom end of sleeve 37 the housing 34 is secured to the top of a vacuum valve housing 40 having the passage 42 therethrough in line with the sleeve. This valve being conventional is not shown or described in detail. It is sufficient to note that a slide 44 therein is movable horizontally to close the passage 42 when desired. When the valve is open, the slide 44 being withdrawn from the passage, the surrounding sleeve 38 which is shown in the inoperative position is movable down through the passage 42 as by a fluid actuator 46, the piston rod 48 of which is attached to a lug 49 on the sleeve 38. When the sleeve 38 is in its lower operative position the sleeve 38 extends through the passage 42 and guides the particulate material past the valve mechanism so that none of this material will lodge in the guides for the slide 44.

Below valve 40 is another duct or spout 50 also in line with duct 32 and sleeve 37. This duct is secured to the wall 52 of a furance, not shown. The duct 32, sleeves 37 and 38 and duct 50 form a vertical passage for the particulate matter from the scoop to the furnace, the valve 40 being in that passage and protected by sleeve 38. This furnace and its function is described in the above identified application Ser. No. 637,624. It is sufficient to note that a conveyor mechanism, preferably a conveyor tube is positioned in the furnace to receive the particulate matter dropping from the scoop 30. This conveyor, to function properly, must receive the particulate matter at a precise rate to assure adequate heating of the material for the proper time as it is carried through the furnace by the conveyor tube. Although the device is described as a tube, it may be the form of conveyor mechanism described in Cox et al U.S. Pat. No. 3,832,107 in which is also described a type of mechanism to which this invention is applicable.

The conveyor belt used in this invention may be a chain link structure 54, FIG. 2, constructed to engage with axial grooves 55 in the supporting rollers. On the outer surface of this clain link structure is a series of sheet metal plates 56 with the edges of adjacent plates closely spaced as shown. The portion of the chain link structure directly below the nozzle is supported by rollers 58 on blocks 60 on the side walls of the housing. In this way a precise spacing between the conveyor belt surface, that is, the plates 56, and the end of the nozzle is maintained. Obviously, the plates 56 are closer together at adjacent edges than the size of the particles of the material being deposited on the conveyor plates.

Although the invention has been shown and described with respect to a preferred embodiment thereof, it should be understood by those skilled in the art that other various changes and omissions in the form and detail thereof may be made therein without departing from the spirit and the scope of the invention.

Having thus described a typical embodiment of my invention, that which I claim as new and desire to secure by Letters Patent of the United States is:

1. Apparatus for delivering particulate material at a selected rate including:
   a vertically positioned delivery spout for the particulate material having a removable bottom end opening,
   a conveyor belt positioned in closely spaced relation below said end opening and having a delivery end, the conveyor belt having a large number of closely spaced plates forming the operative surface of the belt, with the spacing of the belt from the opening establishing a quantity control,
   means positioned directly between the spout and the bottom end opening for adjusting the position of said opening relative to the belt,
   a scoop below the delivery end to receive the particulate material from the belt, and
   means for driving the belt at such a speed as to deliver particulate material at the selected rate from the spout to the scoop.

2. Apparatus as in claim 1 in which the plates are supported by rollers positioned below the plates and adjacent the ends thereof by which the plates are supported in precise relation to and in spaced relation to the end opening of the spout.

3. Apparatus as in claim 1 in which the adjusting means are shims between the opening and spout.

* * * * *